United States Patent
Chen et al.

(10) Patent No.: US 10,116,211 B2
(45) Date of Patent: Oct. 30, 2018

(54) POWER CONVERTER WITH ADAPTIVE ZERO-CROSSING CURRENT DETECTION

(71) Applicant: MediaTek Inc., Hsin-Chu (TW)

(72) Inventors: Yung Hsu Chen, Hsinchu (TW); Kuan-Yu Chu, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/924,910

(22) Filed: Oct. 28, 2015

(65) Prior Publication Data
US 2016/0233771 A1 Aug. 11, 2016

Related U.S. Application Data

(60) Provisional application No. 62/114,665, filed on Feb. 11, 2015.

(51) Int. Cl.
*H02M 3/156* (2006.01)
*H02M 3/158* (2006.01)
*H02M 1/00* (2006.01)

(52) U.S. Cl.
CPC ......... *H02M 3/158* (2013.01); *H02M 3/1588* (2013.01); *H02M 2001/0009* (2013.01); *H02M 2001/0048* (2013.01); *Y02B 70/1466* (2013.01); *Y02B 70/1491* (2013.01)

(58) Field of Classification Search
CPC .... H02M 3/155–3/158; H02M 3/1563; H02M 2001/0067; H02M 2003/1566; H02M 2003/1557; H02M 2001/0012; H02M 2001/0009

USPC .......................................... 323/271, 282–286
See application file for complete search history.

(56) References Cited

U.S. PATENT DOCUMENTS

| | | | |
|---|---|---|---|
| 6,396,250 B1* | 5/2002 | Bridge | H02M 3/1588 323/283 |
| 7,279,877 B1 | 10/2007 | Tseng | |
| 7,936,158 B2 | 5/2011 | Noda | |
| 8,278,889 B2 | 10/2012 | Tateishi | |
| 8,441,238 B2 | 5/2013 | Chen et al. | |
| 8,723,496 B2* | 5/2014 | Sun | H02M 3/1588 323/282 |

(Continued)

FOREIGN PATENT DOCUMENTS

| | | |
|---|---|---|
| CN | 2917082 Y | 6/2007 |
| CN | 101388605 A | 3/2009 |

(Continued)

*Primary Examiner* — Adolf Berhane
(74) *Attorney, Agent, or Firm* — Winston Hsu

(57) ABSTRACT

A power converter with adaptive zero-crossing current detection is provided. The power converter includes a first transistor, a second transistor, a PWM (Pulse Width Modulation) controller, a low-pass filter, and a delay controller. The first transistor is coupled between a supply voltage and a common node. The second transistor is coupled between the common node and a ground voltage. The common node has a reactive voltage. A reactive current flows through the common node. The PWM controller selectively enables and disables the first transistor and the second transistor according to a second control signal and a first transistor control signal. The low-pass filter is coupled between the common node and an output node. The delay controller generates the second control signal according to the reactive voltage.

20 Claims, 4 Drawing Sheets

(56) References Cited

U.S. PATENT DOCUMENTS

| | | | |
|---|---|---|---|
| 9,413,236 B2* | 8/2016 | Kim | H02M 1/44 |
| 9,537,383 B1* | 1/2017 | Wibben | H02M 1/36 |
| 9,812,970 B2* | 11/2017 | Fang | H02M 3/33507 |
| 2008/0012540 A1 | 1/2008 | Chen | |
| 2008/0012545 A1 | 1/2008 | Komiya | |
| 2008/0054869 A1* | 3/2008 | Chang | H02M 3/157 |
| | | | 323/283 |
| 2008/0297065 A1* | 12/2008 | Mubaslat | B64D 27/04 |
| | | | 315/291 |
| 2010/0052629 A1 | 3/2010 | Chu et al. | |
| 2012/0326688 A1* | 12/2012 | Sun | H02M 3/1588 |
| | | | 323/283 |
| 2014/0300329 A1 | 10/2014 | Thompson et al. | |
| 2015/0091536 A1* | 4/2015 | Tanaka | H02M 3/156 |
| | | | 323/235 |
| 2015/0102793 A1 | 4/2015 | Chen et al. | |
| 2015/0145489 A1 | 5/2015 | Hou et al. | |
| 2015/0194891 A1* | 7/2015 | Kim | H02M 3/156 |
| | | | 323/271 |
| 2015/0333611 A1* | 11/2015 | Lakkimsetti | H02M 1/00 |
| | | | 323/271 |

FOREIGN PATENT DOCUMENTS

| | | |
|---|---|---|
| CN | 103501112 | 1/2014 |
| CN | 103616556 | 3/2014 |

\* cited by examiner

POWER CONVERTER WITH ADAPTIVE ZERO-CROSSING CURRENT DETECTION

CROSS REFERENCE TO RELATED APPLICATIONS

This application claims the benefit of U.S. Provisional Application No. 62/114,665, filed on Feb. 11, 2015, the entirety of which is incorporated by reference herein.

BACKGROUND OF THE INVENTION

Field of the Invention

The disclosure generally relates to a power converter, and more particularly, to a power converter with adaptive zero-crossing current detection.

Description of the Related Art

In electrical engineering, power engineering and the electric power industry, power conversion is converting electric energy from one form to another, converting between AC (Alternating current) and DC (Direct Current), or just changing the voltage or frequency, or some combination of these. A power converter is an electrical or electro-mechanical device for converting electrical energy. One way of classifying power conversion systems is according to whether the input and output are AC or DC.

For example, A DC-to-DC converter is an electronic circuit which converts a source of DC from one voltage level to another. DC-to-DC converters are important in portable electronic devices such as cellular phones and laptop computers, which are supplied with power primarily from batteries. Switched DC-to-DC converters offer a method to increase voltage from a partially lowered battery voltage thereby saving space instead of using multiple batteries to accomplish the same thing. DC-to-DC converters developed to maximize the energy harvest for photovoltaic systems and for wind turbines are called power optimizers.

Nowadays, power converters are applied in many technical fields, and it has become a critical challenge for engineers to design a power converter with good performance.

BRIEF SUMMARY OF THE INVENTION

In a preferred embodiment, the disclosure is directed to a power converter with adaptive zero-crossing current detection is provided. The power converter includes a first transistor, a second transistor, a PWM (Pulse Width Modulation) controller, a low-pass filter, and a delay controller. The first transistor is coupled between a supply voltage and a common node. The second transistor is coupled between the common node and a ground voltage. The common node has a reactive voltage. A reactive current flows through the common node. The PWM controller selectively enables and disables the first transistor and the second transistor according to a first transistor control signal and a second control signal. The low-pass filter is coupled between the common node and an output node. The delay controller generates the second control signal according to the reactive voltage.

In some embodiments, the first transistor is a PMOS transistor (P-type Metal Oxide Semiconductor Field Effect Transistor), and the second transistor is an NMOS transistor (N-type Metal Oxide Semiconductor Field Effect Transistor).

In some embodiments, the PWM controller includes a pre-driver and a PWM logic circuit. The pre-driver drives the first transistor and the second transistor. The PWM logic circuit controls the pre-driver according to the second control signal.

In some embodiments, the low-pass filter includes an inductor and a capacitor. The inductor is coupled between the common node and the output node. The capacitor is coupled between the output node and the ground voltage.

In some embodiments, the delay controller includes a first comparator. The first comparator compares the reactive voltage with a reference voltage so as to generate a first control signal.

In some embodiments, the delay controller further includes a delay unit. The delay unit delays the first control signal for a first delay time so as to generate the second control signal.

In some embodiments, the delay unit further delays the second control signal for a second delay time so as to generate a third control signal, and further delays the third control signal for a third delay time so as to generate a fourth control signal.

In some embodiments, the first delay time is adjustable, and the second delay time and the third delay time are predetermined.

In some embodiments, the delay controller further includes a second comparator. The second comparator compares the reactive voltage with the ground voltage so as to generate an evaluation signal.

In some embodiments, the delay controller further includes a sampling unit. The sampling unit samples the evaluation signal at a transition edge of the third control signal so as to generate a first digital signal, and samples the evaluation signal at a transition edge of the fourth control signal so as to generate a second digital signal.

In some embodiments, the delay controller further includes a sequential counter. The sequential counter selectively increases a digital number according to the first digital signal and the second digital signal.

In some embodiments, the sequential counter keeps increasing the digital number until the first digital signal and the second digital signal have different logic levels.

In some embodiments, the delay unit adjusts the first delay time in proportion to the digital number.

In some embodiments, if the first digital signal and the second digital signal have different logic levels, it represents that the first delay time has been optimized, and the second transistor is disabled at a specific time when the reactive current substantially reaches to zero.

In some embodiments, in a first operation state, the first transistor and the second transistor are both disabled, such that the reactive voltage is kept at a previous output voltage, and the reactive current is kept at zero.

In some embodiments, in a second operation state, the first transistor is enabled and the second transistor is disabled, such that the reactive voltage immediately rises from the previous output voltage to the supply voltage, and the reactive current gradually increases from zero to a maximum value.

In some embodiments, in a third operation state, the first transistor is disabled and the second transistor is enabled, such that the reactive voltage immediately falls from the supply voltage to a negative voltage and then gradually rises from the negative voltage, and the reactive current gradually decreases from the maximum value.

In some embodiments, the second transistor is disabled at a transition edge of the second control signal, thereby terminating the third operation state.

In some embodiments, in a fourth operation state, the first transistor and the second transistor are both disabled, such that an additional current path is formed by a body diode of the second transistor, and the reactive current flows through the additional current path and gradually decreases to zero.

In some embodiments, after the reactive current decreases to zero, the reactive voltage starts to oscillate up.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention will be described in detail as follows.

Figure 1:
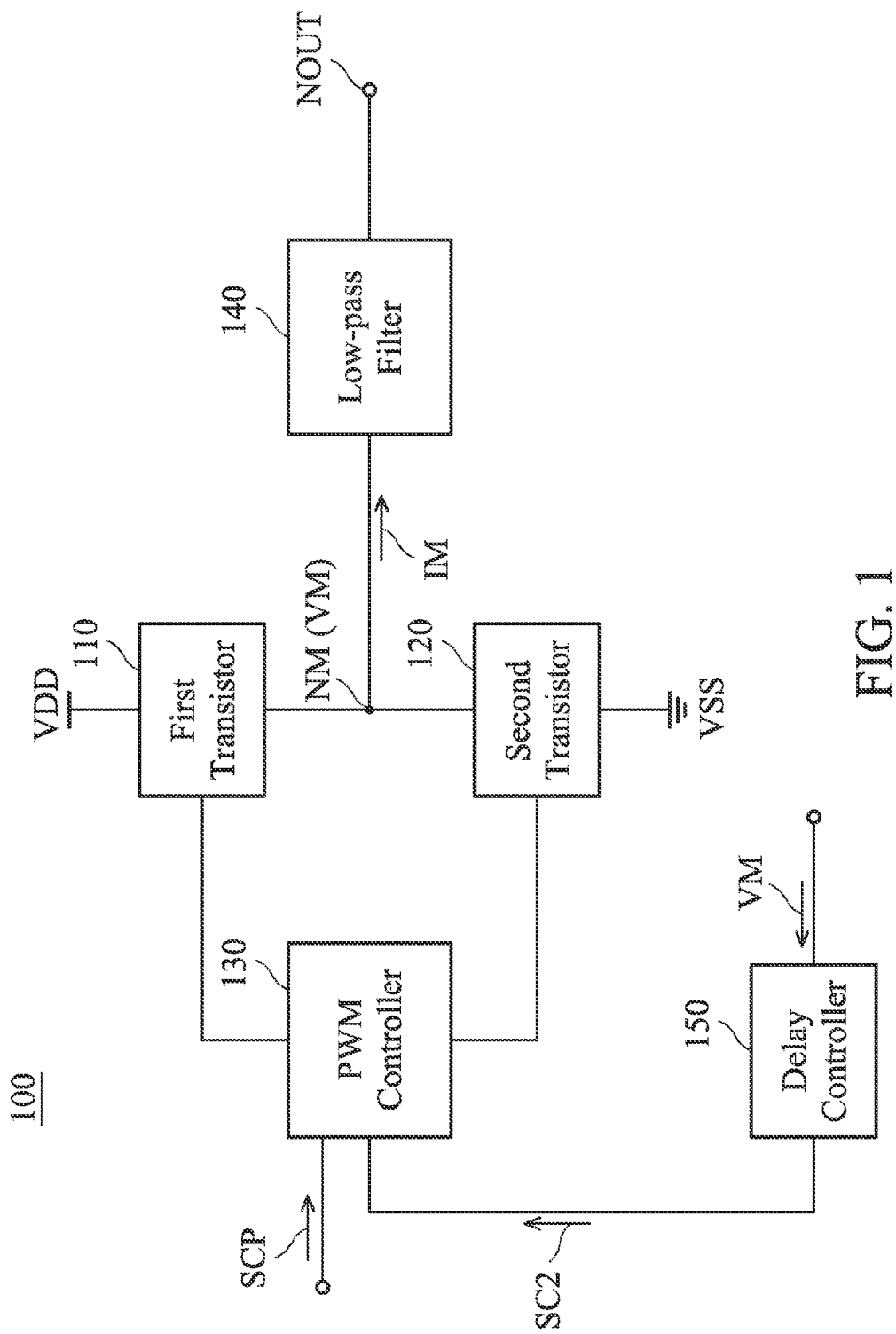
FIG. 1 is a diagram of a power converter according to an embodiment of the invention.

FIG. 1 is a diagram of a power converter 100 according to an embodiment of the invention. For example, the power converter 100 may be a DC-to-DC converter for application in a variety of electronic devices, such as the chips in a smartphone, a tablet computer, or a notebook computer. Generally speaking, the power converter 100 includes a first transistor 110, a second transistor 120, a PWM (Pulse Width Modulation) controller 130, a low-pass filter 140, and a delay controller 150. The first transistor 110 is coupled between a supply voltage VDD (e.g., 3.8V, but not limited thereto) and a common node NM. The second transistor 120 is coupled between the common node NM and a ground voltage VSS (e.g., 0V). The common node NM has a reactive voltage VM, and a reactive current IM flows through the common node NM. The PWM controller 130 selectively enables and disables the first transistor 110 and the second transistor 120 according to a second control signal SC2 and a first transistor control signal SCP. The low-pass filter 140 is coupled between the common node NM and an output node NOUT. The delay controller 150 generates the second control signal SC2 according to the reactive voltage VM at the common node NM. The first transistor control signal SCP may come from a control loop (not shown) of the power converter 100. Specifically, the first transistor 110 may be enabled or disabled according to the first transistor control signal SCP, and the second transistor 120 may be enabled or disabled according to the second control signal SC2.

The power converter 100 is arranged with adaptive zero-crossing current detection. The detailed structure and operation of the power converter 100 will be described in the following embodiments. It should be understood that these embodiments and figures are used for readers to easily understand the operation theory of the invention, but they are not limitations of the scope of the present patent application.

Figure 2:
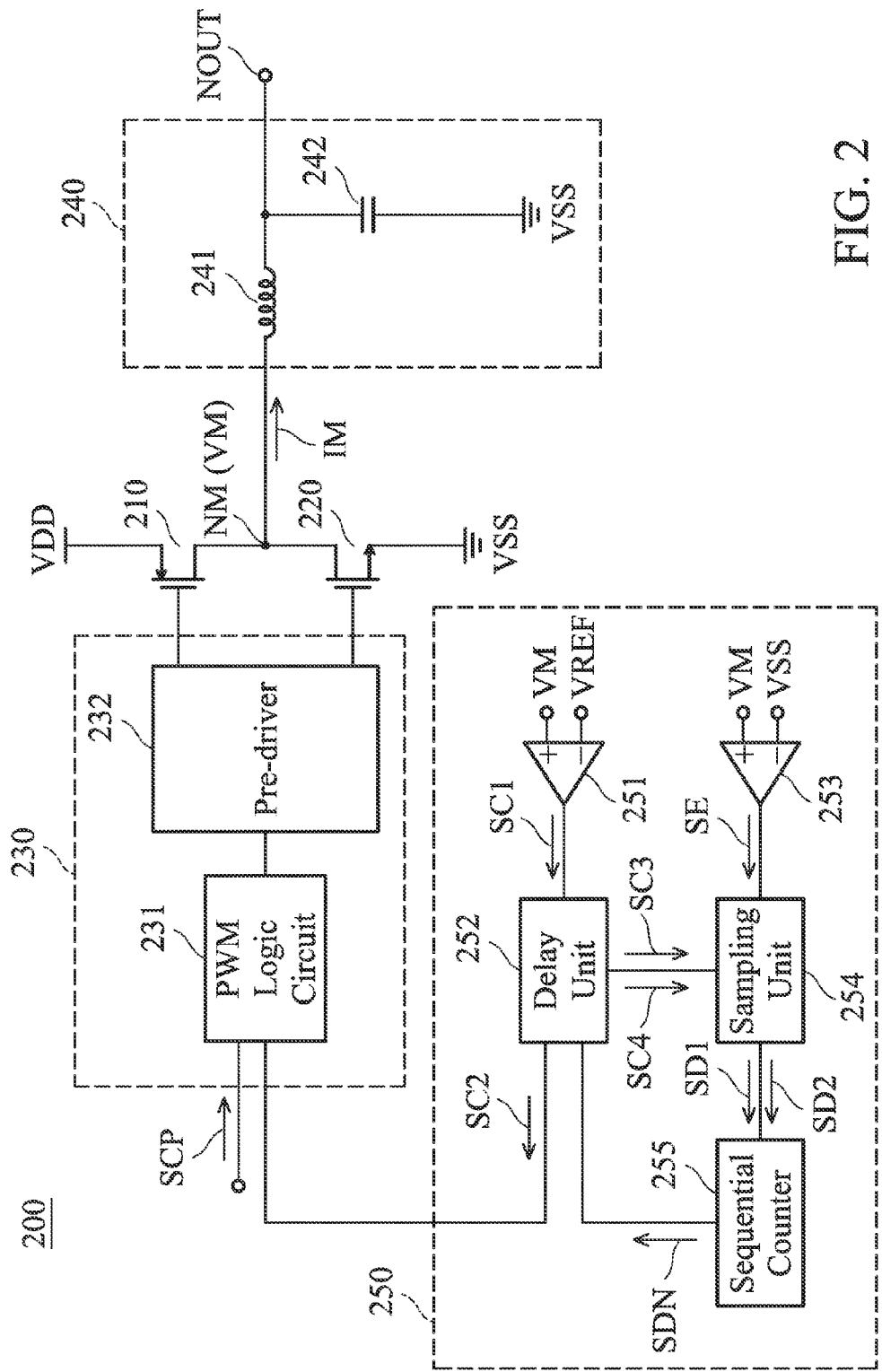
FIG. 2 is a diagram of a power converter according to an embodiment of the invention.

FIG. 2 is a diagram of a power converter 200 according to an embodiment of the invention. FIG. 2 is similar to FIG. 1. In the embodiment of FIG. 2, the power converter 200 includes a first transistor 210, a second transistor 220, a PWM controller 230, a low-pass filter 240, and a delay controller 250. The first transistor 210 is a PMOS transistor (P-type Metal Oxide Semiconductor Field Effect Transistor) which has a gate coupled to the PWM controller 230, a source coupled to a supply voltage VDD, and a drain coupled to a common node NM. The second transistor 220 is an NMOS transistor (N-type Metal Oxide Semiconductor Field Effect Transistor) which has a gate coupled to the PWM controller 230, a source coupled to a ground voltage VSS, and a drain coupled to the common node NM. The common node NM has a reactive voltage VM, and a reactive current IM flows through the common node NM. The PWM controller 230 includes a PWM logic circuit 231 and a pre-driver 232. The pre-driver 232 generates a relatively large current for driving the gates of the first transistor 210 and the second transistor 220. The PWM logic circuit 231 controls the pre-driver 232 according to a second control signal SC2. Specifically, the PWM logic circuit 231 causes the pre-driver 232 to selectively enable and disable the first transistor 210 and the second transistor 220. The low-pass filter 240 includes an inductor 241 and a capacitor 242. The inductor 241 is coupled between the common node NM and an output node NOUT. The capacitor 242 is coupled between the output node NOUT and the ground voltage VSS.

The delay controller 250 is mainly configured to fine-tune a delay time of the aforementioned second control signal SC2. The delay controller 250 includes a first comparator 251, a delay unit 252, a second comparator 253, a sampling unit 254, and a sequential counter 255. The first comparator 251 compares the reactive voltage VM with a reference voltage VREF (e.g., −0.1V, but not limited thereto) so as to generate a first control signal SC1. Specifically, the first comparator 251 has a positive input terminal for receiving the reactive voltage VM, a negative input terminal for receiving the reference voltage VREF, and an output terminal for outputting the first control signal SC1. The delay unit 252 delays the first control signal SC1 for a first delay time T1 so as to generate the second control signal SC2. The delay unit 252 may have a memory function, and it also delays the second control signal SC2 for a second delay time T2 so as to generate a third control signal SC3, and also delays the third control signal SC3 for a third delay time T3 so as to generate a fourth control signal SC4. Preferably, the first delay time T1 may be adjustable, and the second delay time T2 and the third delay time T3 may be predetermined. For example, the second delay time T2 and the third delay time T3 may be fixed 10 ns, or may be other values in response to the parasitic inductance and parasitic capacitance of the power converter 200.

The second comparator 253 compares the reactive voltage VM with the ground voltage VSS so as to generate an evaluation signal SE. Specifically, the second comparator 253 has a positive input terminal for receiving the reactive voltage VM, a negative input terminal for receiving the ground voltage VSS, and an output terminal for outputting the evaluation signal SE. The sampling unit 254 samples the evaluation signal SE at a transition (rising) edge of the third control signal SC3 so as to generate a first digital signal SD1, and also samples the evaluation signal SE at a transition (rising) edge of the fourth control signal SC4 so as to generate a second digital signal SD2. The sequential counter 255 selectively increases a digital number SDN according to the first digital signal SD1 and the second digital signal SD2. For example, the digital number SDN may be set to a small value initially, and then the sequential counter 255 may keep increasing the digital number SDN every clock cycle until the first digital signal SD1 and the second digital signal SD2 have different logic levels. The delay unit 252 further adjusts the first delay time T1 in proportion to the digital number SDN. In other words, if the digital number SDN increases by one unit, the first delay time T1 will also increase by one time unit.

Figure 3A:
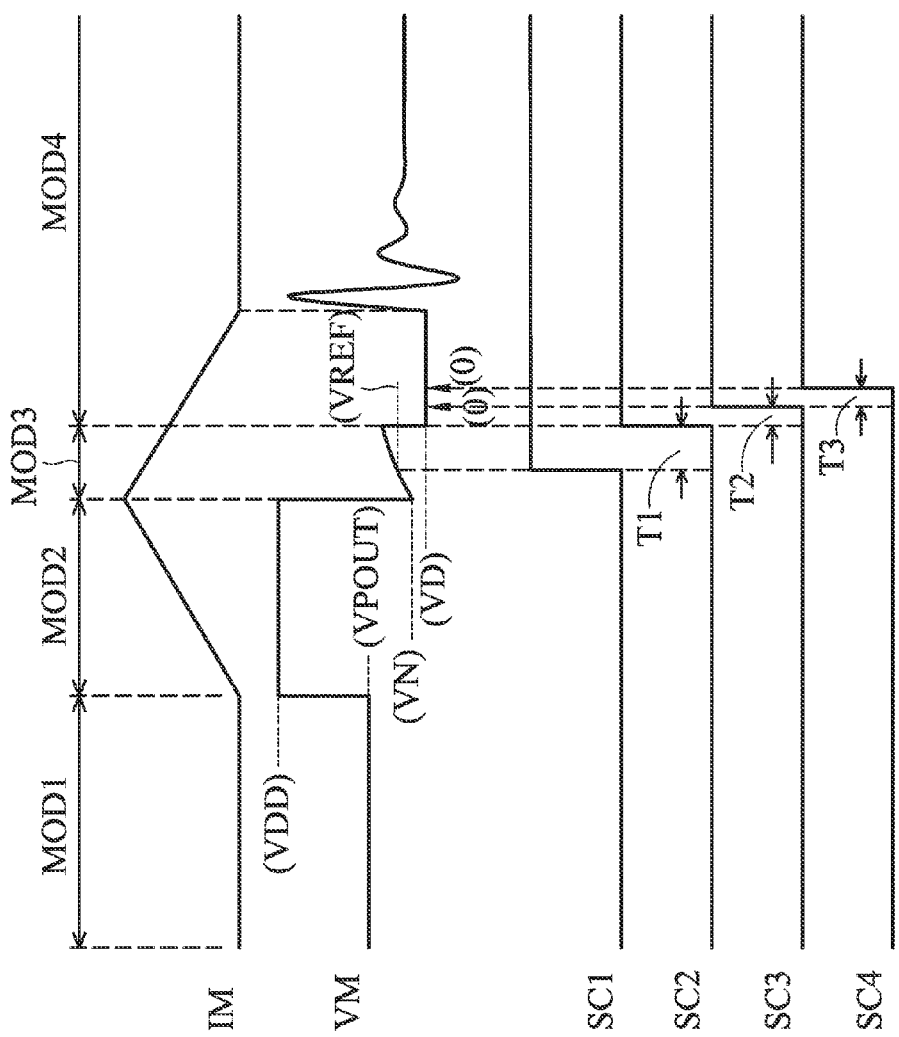
FIG. 3A is a diagram of signal waveforms of a power converter according to an embodiment of the invention.

FIG. 3A is a diagram of signal waveforms of the power converter 200 according to an embodiment of the invention. FIG. 3A represents the initial state of the power converter 200, and the initial first delay time T1 is set as short as possible. The horizontal axis is time axis, and the vertical axis is voltage level axis. Please refer to FIG. 2 and FIG. 3A together. The whole operation of the power converter 200 can be divided into a first operation mode MOD1, a second operation mode MOD2, a third operation mode MOD3, and a fourth operation mode MOD4. The above four operation modes can be performed periodically.

In the first operation state MOD1, the first transistor 210 and the second transistor 220 are both disabled. At this time, the reactive voltage VM is kept at a previous output voltage VPOUT (e.g., equal to the voltage at the output node NOUT, such as 1.2V), and the reactive current IM is kept at zero.

In the second operation state MOD2, the first transistor 210 is enabled and the second transistor 220 is disabled. A pulling-up current path is formed from the supply voltage VDD through the enabled first transistor 210 to the common node NM. As a result, the reactive voltage VM immediately rises from the previous output voltage VPOUT to the supply voltage VDD (in fact, it is slightly lower than the supply voltage VDD due to an IR-drop across the first transistor 210), and the reactive current IM gradually increases from zero to a maximum value. The reactive current IM flows through the inductor 241, and energy is stored in the inductor 241.

In the third operation state MOD3, the first transistor 210 is disabled and the second transistor 220 is enabled. A pulling-down current path is formed from the common node NM through the enabled second transistor 220 to the ground voltage VSS. As a result, the reactive voltage VM immediately falls from the supply voltage VDD to a negative voltage VN (e.g., −0.3V, but not limited thereto) and then gradually rises from the negative voltage VN, and the reactive current IM gradually decreases from the maximum value. In the beginning of the third operation mode MOD3, the reactive voltage VM falls to the negative voltage VN, lower than the ground voltage VSS, because of an IR-drop existing across the second transistor 220. It should be noted that the reactive current IM flowing through the inductor 241 is always continuous over the time axis. When the first transistor 210 is suddenly disabled and the second transistor 220 is suddenly enabled, the reactive current IM should be forced to flow from the ground voltage VSS through the second transistor 220 to the common node NM and the inductor 241, and it results in an IR-drop between the source and drain of the second transistor 220. Accordingly, in the beginning of the third operation mode MOD3, the reactive voltage VM at the common node NM immediately falls to the negative voltage VN which is equal to the ground voltage VSS minus the IR-drop. Then, with the reactive current IM gradually decreasing from the maximum value, the IR-drop becomes smaller, and therefore the reactive voltage VM gradually rises from the negative voltage VN to the reference voltage VREF (e.g., −0.1V, but not limited thereto). It triggers the switching operation of the first comparator 251, such that the first control signal SC1 rises from a low logic level to a high logic level. As mentioned above, the second control signal SC2 is generated by delaying the first control signal SC1 for the first delay time T1, and it is used to selectively enable and disable the first transistor 210 and the second transistor 220. Therefore, when the first delay time T1 has expired, the second control signal SC2 also rises from a low logic level to a high logic level. The second transistor 220 is disabled accordingly at a transition (rising) edge of the second control signal SC2, thereby terminating the third operation state MOD3 and entering the fourth operation mode MOD4.

In the fourth operation state MOD4, the first transistor 210 and the second transistor 220 are both disabled. As mentioned above, the reactive current IM flowing through the inductor 241 is always continuous over the time axis. An additional current path is formed by a body diode of the second transistor 220. The reactive current IM is forced to flow from the ground voltage VSS through the additional current path (i.e., the body diode) to the common node NM and the inductor 241, such that the reactive voltage VM is kept at a negative diode voltage VD (e.g., −0.7V) which is equal to the ground voltage VSS minus a cut-in voltage (e.g., 0.7V) of the body diode of the second transistor 220. At this time, the reactive current IM gradually decreases to zero. As mentioned above, the third control signal SC3 is generated by delaying the second control signal SC2 for the second delay time T2, and the fourth control signal SC4 is generated by delaying the third control signal SC3 for the third delay time T3. The third control signal SC3 and fourth control signal SC4 causes the sampling unit 254 to sample the evaluation signal SE at their transition (rising) edges, and the two sampled signals form the first digital signal SD1 and the second digital signal SD2. Because the initial first delay time T1 is very short, the transition (rising) edges of the third control signal SC3 and fourth control signal SC4 should both be aligned with the reactive voltage VM which is kept at the negative diode voltage VD (e.g., −0.7V, which is lower than the ground voltage VSS), such that the first digital signal SD1 and the second digital signal SD2 both have logic levels "0". That is, a logic combination of the first digital signal SD1 and the second digital signal SD2 is the two logic bits "00", and it represents that the first delay time T1 is too short.

If the logic combination of the first digital signal SD1 and the second digital signal SD2 is the logic bits "00" (i.e., the first digital signal SD1 and the second digital signal SD2 have the same logic levels), the sequential counter 255 can keep increasing the digital number SDN every clock cycle, and the delay unit 252 can keep increasing the first delay time T1 in proportion to the digital number SDN every clock cycle. The above tuning procedure is performed until the logic combination of the first digital signal SD1 and the second digital signal SD2 becomes the logic bits "01" (i.e., the first digital signal SD1 and the second digital signal SD2 have different logic levels).

Figure 3B:
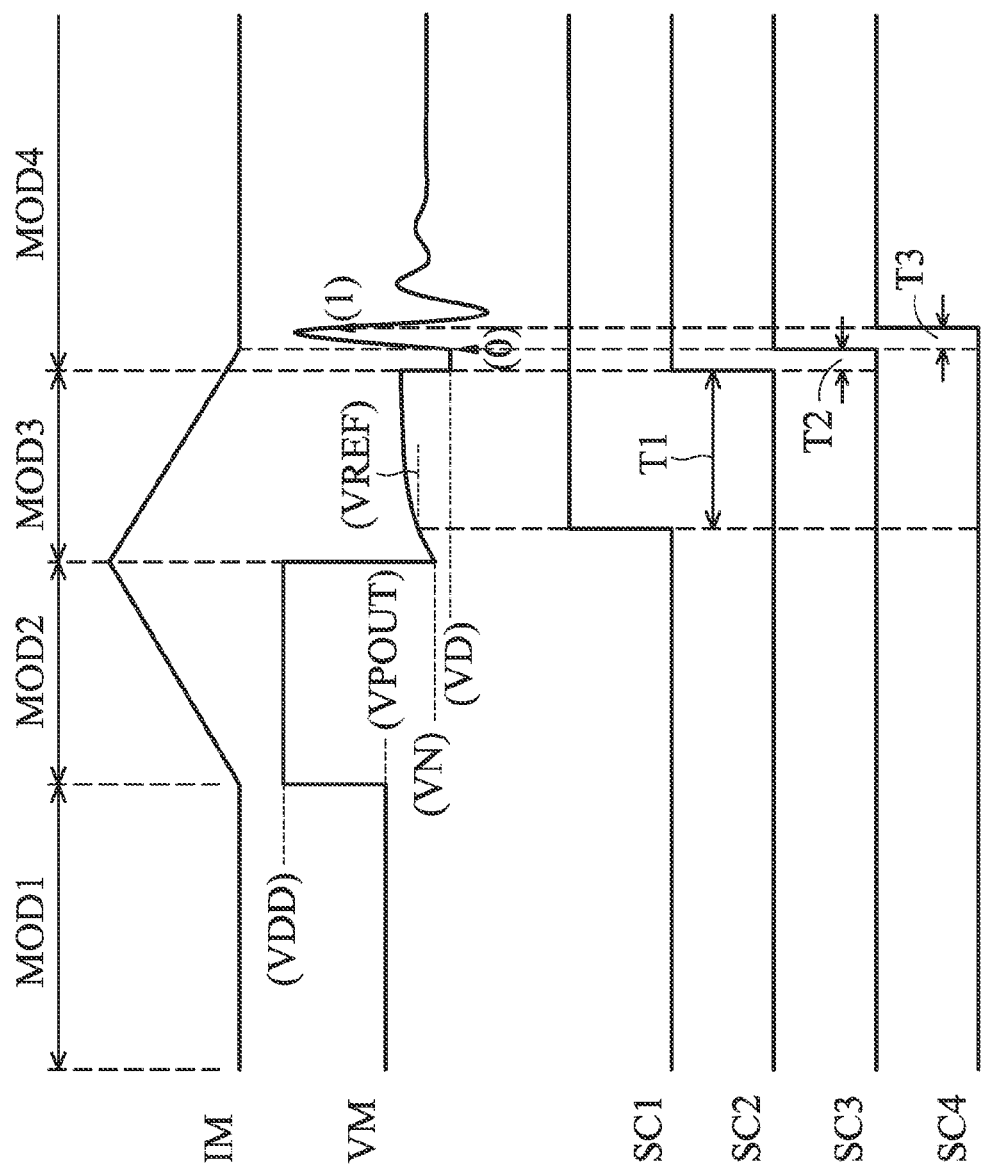
FIG. 3B is a diagram of signal waveforms of a power converter according to an embodiment of the invention.

FIG. 3B is a diagram of signal waveforms of the power converter 200 according to an embodiment of the invention. FIG. 3B represents the final state of the power converter 200. The horizontal axis is time axis, and the vertical axis is voltage level axis. When the above tuning procedure is finished, the first digital signal SD1 and the second digital signal SD2 become different logic levels. It represents that the first delay time T1 has been optimized, and the second transistor 220 is disabled at a specific time when the reactive current IM substantially reaches to zero (i.e., the so-called zero-crossing current). Specifically, after the reactive current IM reaches to zero, the reactive voltage VM starts to oscillate up due to the parasitic inductance and parasitic capacitance at the common node NM of the power converter 200. As a result, the transition (rising) edge of the third control signal SC3 should be aligned with the reactive voltage VM which is kept at the negative diode voltage VD (e.g., −0.7V, which is lower than the ground voltage VSS), and the transition (rising) edge of fourth control signal SC4 should be aligned with the reactive voltage VM which oscillates to a relatively high voltage (e.g., 1.2V, which is higher than the ground voltage VSS), such that the first digital signal SD1 has a logic level "0" and the second digital signal SD2 has a logic level "1". That is, a logic combination of the first digital signal SD1 and the second digital signal SD2 is the two logic bits "01". Since the first digital signal SD1 and the second digital signal SD2 have different logic levels, the sequential counter 255 stops increasing the digital number SDN, and the delay unit 252 stops increasing the first delay time T1. Under the circumstance, the first delay time T1 has been fine-tuned and reached an optimized value, and it improves the performance of the power converter 200 so much. For example, the total power consumption of the power converter 200 can be significantly reduced if the pulling-down transistor (i.e., the second transistor 220) is exactly disabled at a specific time when the inductor current (i.e., the reactive current IM) reaches to zero. Such a design can be considered as the so-called "adaptive zero-crossing current detection".

It should be understood that FIG. 3A and FIG. 3B are not drawn according to standard scaling. For example, the negative voltage VD is deeper, and the second delay time T2 and the third delay time T3 are longer than their actual scaling when they are displayed in FIG. 3A and FIG. 3B. As a matter of fact, the negative voltage VD is just slightly lower than the ground voltage VSS, and the second delay time T2 and the third delay time T3 are very short time periods. These specific regions are enlarged and emphasized for readers to easily understand the mechanism of the invention.

The invention proposes a power converter with adaptive zero-crossing current detection. In comparison to the prior art, the invention uses a delay controller for providing an adjustable delay time in such a manner that a pulling-down transistor of the power converter is disabled at a specific time when a current flowing through an inductor substantially reaches to zero. Conversely, the conventional design merely provides a fixed delay time, and it results in more power consumption than the invention. In conclusion, the invention proposes a high-efficiency power converter which is suitable for application in a variety of integrated circuit designs.

It is understood that the power converter of the invention is not limited to the configurations and of FIGS. 1-3B. The invention may merely include any one or more features of any one or more embodiments of FIGS. 1-3B. In other words, not all of the features shown in the figures should be implemented in the power converter of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power converter, comprising:
    a first transistor, coupled between a VDD supply voltage and a common node;
    a second transistor, coupled between the common node and a ground voltage, wherein the common node has a reactive voltage, and a reactive current flows through the common node;
    a PWM (Pulse Width Modulation) controller, selectively enabling and disabling the first transistor and the second transistor according to a second control signal and a first transistor control signal;
    a low-pass filter, coupled between the common node and an output node; and
    a delay controller, generating the second control signal according to a first control signal, wherein the delay controller comprises:
        a first comparator, comparing the reactive voltage with a reference voltage so as to generate the first control signal; and
        a delay unit directly connected to an output of the first compactor, directly delaying the first control signal for a first delay time so as to generate the second control signal.

2. The power converter as claimed in claim 1, wherein the first transistor is a PMOS transistor (P-type Metal Oxide Semiconductor Field Effect Transistor), and the second transistor is an NMOS transistor (N-type Metal Oxide Semiconductor Field Effect Transistor).

3. The power converter as claimed in claim 1, wherein the PWM controller comprises:
    a pre-driver, driving the first transistor and the second transistor; and
    a PWM logic circuit, controlling the pre-driver according to the second control signal.

4. The power converter as claimed in claim 1, wherein the low-pass filter comprises:
    an inductor, coupled between the common node and the output node; and
    a capacitor, coupled between the output node and the ground voltage.

5. The power converter as claimed in claim 1, wherein in a first operation state, the first transistor and the second transistor are both disabled, such that the reactive voltage is kept at a previous output voltage, and the reactive current is kept at zero.

6. The power converter as claimed in claim 5, wherein in a second operation state, the first transistor is enabled and the second transistor is disabled, such that the reactive voltage immediately rises from the previous output voltage to the supply voltage, and the reactive current gradually increases from zero to a maximum value.

7. The power converter as claimed in claim 1, wherein the delay unit further delays the second control signal for a second delay time so as to generate a third control signal, and further delays the third control signal for a third delay time so as to generate a fourth control signal.

8. The power converter as claimed in claim 1, wherein the first delay time is adjustable.

9. The power converter as claimed in claim 8, wherein the delay unit is controlled to continuously increase the first delay time until signals within the delay unit satisfies a condition, so as to determine an optimized value of the first delay time.

10. The power converter as claimed in claim 7, wherein the first delay time is adjustable, and the second delay time and the third delay time are predetermined.

11. The power converter as claimed in claim 10, wherein the delay controller further comprises:
a second comparator, comparing the reactive voltage with the ground voltage so as to generate an evaluation signal.

12. A power converter, comprising:
a first transistor, coupled between a supply voltage and a common node;
a second transistor, coupled between the common node and a ground voltage, wherein the common node has a reactive voltage, and a reactive current flows through the common node;
a PWM (Pulse Width Modulation) controller, selectively enabling and disabling the first transistor and the second transistor according to a second control signal and a first transistor control signal;
a low-pass filter, coupled between the common node and an output node; and
a delay controller, generating the second control signal according to the first control signal, wherein the delay controller comprises:
a first comparator, comparing the reactive voltage with a reference voltage so as to generate a first control signal;
a delay unit, delaying the first control signal for a first delay time so as to generate the second control signal, wherein the delay unit further delays the second control signal for a second delay time so as to generate a third control signal, and further delays the third control signal for a third delay time so as to generate a fourth control signal, wherein the first delay time is adjustable, and the second delay time and the third delay time are predetermined;
a second comparator, comparing the reactive voltage with the ground voltage so as to generate an evaluation signal; and
a sampling unit, sampling the evaluation signal at a transition edge of the third control signal so as to generate a first digital signal, and sampling the evaluation signal at a transition edge of the fourth control signal so as to generate a second digital signal.

13. The power converter as claimed in claim 12, wherein the delay controller further comprises:
a sequential counter, selectively increasing a digital number according to the first digital signal and the second digital signal.

14. The power converter as claimed in claim 13, wherein the sequential counter keeps increasing the digital number until the first digital signal and the second digital signal have different logic levels.

15. The power converter as claimed in claim 13, wherein the delay unit adjusts the first delay time in proportion to the digital number.

16. The power converter as claimed in claim 13, wherein if the first digital signal and the second digital signal have different logic levels, it represents that the first delay time has been optimized, and the second transistor is disabled at a specific time when the reactive current substantially reaches to zero.

17. A power converter, comprising:
a first transistor, coupled between a supply voltage and a common node;
a second transistor, coupled between the common node and a ground voltage, wherein the common node has a reactive voltage, and a reactive current flows through the common node;
a PWM (Pulse Width Modulation) controller, selectively enabling and disabling the first transistor and the second transistor according to a second control signal and a first transistor control signal;
a low-pass filter, coupled between the common node and an output node; and
a delay controller, generating the second control signal according to the first control signal;
wherein in a first operation state, the first transistor and the second transistor are both disabled, such that the reactive voltage is kept at a previous output voltage, and the reactive current is kept at zero,
wherein in a second operation state, the first transistor is enabled and the second transistor is disabled, such that the reactive voltage immediately rises from the previous output voltage to the supply voltage, and the reactive current gradually increases from zero to a maximum value;
wherein in a third operation state, the first transistor is disabled and the second transistor is enabled, such that the reactive voltage immediately falls from the supply voltage to a negative voltage and then gradually rises from the negative voltage, and the reactive current gradually decreases from the maximum value.

18. The power converter as claimed in claim 17, wherein the second transistor is disabled at a transition edge of the second control signal, thereby terminating the third operation state.

19. The power converter as claimed in claim 18, wherein in a fourth operation state, the first transistor and the second transistor are both disabled, such that an additional current path is formed by a body diode of the second transistor, and the reactive current flows through the additional current path and gradually decreases to zero.

20. The power converter as claimed in claim 19, wherein after the reactive current decreases to zero, the reactive voltage starts to oscillate up.

* * * * *